United States Patent
Thumula et al.

(10) Patent No.: US 8,527,309 B2
(45) Date of Patent: Sep. 3, 2013

(54) TARGETED CAMPAIGN MANAGEMENT SYSTEM AND METHOD

(75) Inventors: Sandeep Thumula, Ashburn, VA (US); Maxim Diatchenko, Gainesville, VA (US); Anjaneyulu Sadineni, Ashburn, VA (US); Aravind Panyam, Sterling, VA (US)

(73) Assignee: Verisign, Inc., Dulles, VA (US)

( * ) Notice: Subject to any disclaimer, the term of this patent is extended or adjusted under 35 U.S.C. 154(b) by 82 days.

(21) Appl. No.: 13/174,540

(22) Filed: Jun. 30, 2011

(65) Prior Publication Data

US 2013/0006710 A1 Jan. 3, 2013

(51) Int. Cl.
*G06Q 10/00* (2012.01)
*G06Q 30/00* (2012.01)

(52) U.S. Cl.
USPC .......................................... 705/7.11; 705/7.35

(58) Field of Classification Search
USPC ............................................... 705/7.11, 7.35
See application file for complete search history.

(56) References Cited

U.S. PATENT DOCUMENTS

| | | | | |
|---|---|---|---|---|
| 7,188,138 B1 * | 3/2007 | Schneider | | 709/203 |
| 7,418,471 B2 * | 8/2008 | King et al. | | 709/203 |
| 7,653,594 B2 | 1/2010 | Davis | | |
| 7,797,224 B2 | 9/2010 | Barone et al. | | |
| 7,921,069 B2 | 4/2011 | Canny et al. | | |
| 8,200,583 B1 * | 6/2012 | Adkins et al. | | 705/307 |
| 2001/0014868 A1 | 8/2001 | Herz et al. | | |
| 2003/0004744 A1 | 1/2003 | Greene et al. | | |
| 2007/0214284 A1 | 9/2007 | King et al. | | |
| 2007/0239535 A1 | 10/2007 | Koran et al. | | |
| 2007/0299967 A1 | 12/2007 | Brady | | |
| 2008/0077459 A1 | 3/2008 | Desai et al. | | |
| 2009/0119198 A1 | 5/2009 | Manriquez et al. | | |
| 2009/0254545 A1 | 10/2009 | Fisken | | |
| 2010/0017218 A1 * | 1/2010 | Gazetova et al. | | 705/1 |
| 2010/0106650 A1 * | 4/2010 | Adelman et al. | | 705/80 |
| 2010/0228629 A1 | 9/2010 | Harrison et al. | | |
| 2011/0016022 A1 | 1/2011 | Essawi et al. | | |
| 2011/0016217 A1 * | 1/2011 | Simpson et al. | | 709/228 |

OTHER PUBLICATIONS

Afternic, Domain Name Appraisal and DNI Score Sample, Jul. 18, 2010, http://www.afternic.com/rsample.html.
Wu Zu-Guang and He Hai-Yi , Domain Name Valuation Model Constructing and Emperical Evidence, International Conference on Multimedia Information Networking and Security, 2009, Nov. 18-20, 2009, pp. 201-204, IEEE 978-0-7695-3843-3/09.

(Continued)

*Primary Examiner* — Mark A Fleischer
(74) *Attorney, Agent, or Firm* — MH2 Technology Law Group, LLP (57) ABSTRACT

A system, method, and computer-readable medium, is described that provides a probability of deletion (or renewal rate) prediction for a domain name based on a historical model of expired and renewed domain names. Domain name attribute sets are defined using domain attribute/value combinations. These sets are used to classify past expired and renewed domain names into each of the applicable sets where the domain attribute and values match the expired or renewed domain names. The percentage of renewed domain names in a set is used to predict the likelihood that a user will renew a domain name set to expire in a defined window and that matches the attribute/value combinations that make up the domain attribute set. This predicted percentage is used to target domains and deliver marketing offers to the domain contacts.

22 Claims, 11 Drawing Sheets

(56) References Cited

OTHER PUBLICATIONS

EPO: "Mitteilung des Europaischen Patentamts vom 1. Oktober 2007 uber Geschaftsmethoden = Notice from the European Patent Office dated Oct. 1, 2007 concerning business methods = Communique de l'Office europeen des brevets, en date du ler octobre 2007, concernant les methodes dans le domaine des activites", Journal Officiel De L'Office Europeen Des Brevets. Official Journal of the European Patent Office. Amtsblatt Des Europaeischen Patentamts, OEB, Munchen, DE, vol. 30, No. 11, Nov. 1, 2007, pp. 592-593, XP007905525, ISSN: 0170-9291.

Extended European Search Report, dated Nov. 7, 2012, European Application No. EP 12174529, filed Jun. 29, 2012, pp. 1-8, published by the European Patent Office.

* cited by examiner

| Exemplary Domain Name Attributes | Exemplary Attribute Values |
|---|---|
| GURID – Unique Identifier for Registrar | Registrar1, Registrar2 |
| TLD – Name of the top level domain | COM, NET |
| Domain Type | ASCII, IDN |
| Domain Renewal History – History of how a domain was renewed | Renewed once before |
| Age of domain – Number of years since creation of domain | Less than 10 years |
| Percentage of domain name covered by actual word from dictionary | More than 60% Dictionary Word / Variant |
| Length of domain | More than 8 characters |
| Average duration of registration periods | Less than three years |
| Number of Unique Registrations | Been registered more than twice |
| Domain contains dash | Yes, No |
| Popularity of website at domain | Rank not in the top 1,000,000 sites |
| Economic indicators by geographic regions | Recession, Local Stability, Unemployment rate |
| Previous Marketing program indicators | Accepted offer once before |

Fig. 4

| | GRUID | TLD | Type | Renewal History | Age | Dictionary Word | Length | Popularity | Economic Indicators | Previous Marketing |
|---|---|---|---|---|---|---|---|---|---|---|
| Domain Set 1 | 001 | COM | ASCII | at least once | five years or more | Yes | more than 8 characters | Top 1 to 3 Million | Recession | Responded to Previous Offer |
| Domain Set 2 | 001 | COM | ASCII | between three and six times | three years or less | Partial >80% | less than 10 characters | Top 1 to 3 Million | Localized Stability | X |
| Domain Set 3 | 001 | COM, NET | ASCII | X | three years or less | No | between 8 and 14 characters | Top 1 to 3 Million | X | Website Hosted with Registrar |
| Domain Set 4 | 002, 003, 004 | COM | ASCII | Never | three years or less | Partial >80% | X | Top 3 to 5 Million | X | X |
| Domain Set 5 | 002, 003, 004 | COM | ASCII | Never | X | Yes | less than 8 characters | X | X | X |
| Domain Set 6 | 005 | COM | ASCII | X | X | Partial >80% | less than 8 characters | X | X | X |
| ... | | | | | | | | | | |
| Domain Set n | 55 | COM | INT | | | Partial >80% | less than 8 characters | X | Recession | Responded to Previous Offer |

Registrar Campaign Management Tool

All Campaigns

| Campaign Name | Days | Status | Start Date | End Date | Action |
|---|---|---|---|---|---|
| 15th Day .COM Campaign for 10%-30% Ranks | 15 | Active | 08-25-2010 | 09-25-2010 | View/Edit |
| 7th Day .COM Campaign for 50%-80% Ranks | 7 | Active | 08-15-2010 | 09-25-2010 | View/Edit |
| 15 th Day .NET Campaign for 1% - 30% Ranks | 15 | Active | 08-25-2010 | 09-25-2010 | View/Edit |
| 2nd Day .COM Campaign for 1%-50% Ranks | 2 | Active | 08-25-2010 | 09-30-2010 | View/Edit |
| 2nd Day .NET Campaign for 1%-50% Ranks | 2 | Active | 08-25-2010 | 11-30-2010 | View/Edit |
| 10 Day .COM Free Mobile View Campaign | 10 | Active | 08-25-2010 | 12-31-2010 | View/Edit |
| 180th Day .COM Campaign for Web Hosting | 180 | Active | 09-14-2010 | 10-30-2010 | View/Edit |

Add New

TARGETED CAMPAIGN MANAGEMENT SYSTEM AND METHOD

TECHNICAL FIELD

This disclosure relates to techniques for targeting marketing campaigns to particular customers.

BACKGROUND

The domain name system (DNS) and domain name registration system have become an integral part of how consumers and businesses conduct activity on the Internet.

The DNS system works by an interrelation of registrants, registrars, and registries. For example, registries maintain operative control over a top level domain (TLD), such as the traditional .COM, .NET, .ORG, .EDU, and .GOV, as well as the newer .BIZ, .INFO, and .NAME TLDs. Registrants are the entities that register the use of a domain name in a specific TLD for a finite time. Registrars act like an intermediary between the registrants and registry. Registrars receive and process the registrants' domain name reservation requests, and provide tools and an interface to the registrant to maintain operation of its reserved names. Registries in turn receive and process requests from registrars and provide tools and an interface to the registrar to maintain operation of its customers (registrants) reserved names. The registry makes available the mechanism to reserve and update domain name registrations through the Extensible Provisioning Protocol (EPP). Registrars, who are authorized by the registry, have the ability to make reservations and check the state of domain names through the EPP. The registry provides the EPP as a communications gateway to registrars for such purposes.

This multi-party transaction reserving a domain name takes place through a domain name registration. When registering a domain name, a registrant may initially reserve a domain name from one to ten years. The expiration date of the domain name occurs on the anniversary date of the domain registration at the end of the initial registration period. A domain name registration may be renewed any time, but may never be renewed to an expiration date more than ten years into the future. When a domain name approaches its expiration date, the registrar of the domain name may send reminders to the registrant to renew the domain name.

The registrant will then decide whether the domain name is worth the price of renewal. If so, the registrant will renew the domain name. If not, the registrant will let the domain name lapse into expiration and eventual deletion from the registration system. A registrar may incentivize the registrant to renew the domain name by, among other things, offering multi-year discounts, value-added services, or time limited discounts.

One problem with these types of discounts is that, if offered to every registrant that has a domain name expiring, the registrar may lose revenue by unnecessarily offering discounts to those registrants that would renew the registration without any special incentive. In particular, unless renewed well ahead of time, every domain name will eventually near its expiration date. Some domain names are more desirable than others and some domain names host a more successful website than others. For example, a domain registrant with a domain name that is, by itself, more desirable or that hosts a popular website will likely renew the domain name before it expires. To offer these registrants a discount would be unnecessary and costly in the aggregate.

On the other hand, a domain registrant that has a weak domain name and an unsuccessful website may decide that the cost of renewing the domain is not worth the benefits received at the default price point. It may be that a discount lowering the price point would cause the registrant to change its mind and renew the domain. This would provide additional registration fees to the registrar and, in turn, the registry. A system and method are needed to target expiring domains to provide special discounts tailored to each domain in the hope of persuading registrants to renew the domain name registration.

Even assuming a registrar would like to offer such discounts, it may be infeasible for it to develop a methodology and system of targeting the appropriate domains for offering discounts. A system and method are needed to provide registrars with a tool that would facilitate the offering of discounts without unduly burdening the registrar with the cost of developing a discount system.

SUMMARY

A computer-implemented method defines domain attribute sets and performs an historical analysis of past domains using the domain attributes sets. Expiring domain names are analyzed based on the historical analysis by matching to the domain attribute sets, providing probability of deletion predictions based on the same analysis.

It is to be understood that both the foregoing general description and the following detailed description are exemplary and explanatory only and are not restrictive of the application, as claimed.

The accompanying drawings, which are incorporated in and constitute a part of this specification, illustrate one (several) embodiment(s) of the application and together with the description, serve to explain the principles of the application.

DETAILED DESCRIPTION

Reference will now be made in detail to the exemplary embodiments. Wherever possible, the same reference numbers will be used throughout the drawings to refer to the same or like parts.

The embodiments of the targeted campaign marketing system hope to target those registrants likely to let a domain name lapse at one price point, but renew the domain name at a lower price point, offering appropriate discounts to those registrants. By targeting domain names that likely will expire (and be deleted) without a special marketing offer, the registrar and registry both benefit from increased domain registration renewals that otherwise would likely be lost. Yet, at the same time, the registrar and registry do not sacrifice any revenue from unnecessarily offering the same discount to registrants that would renew without special incentives.

Figure 1:
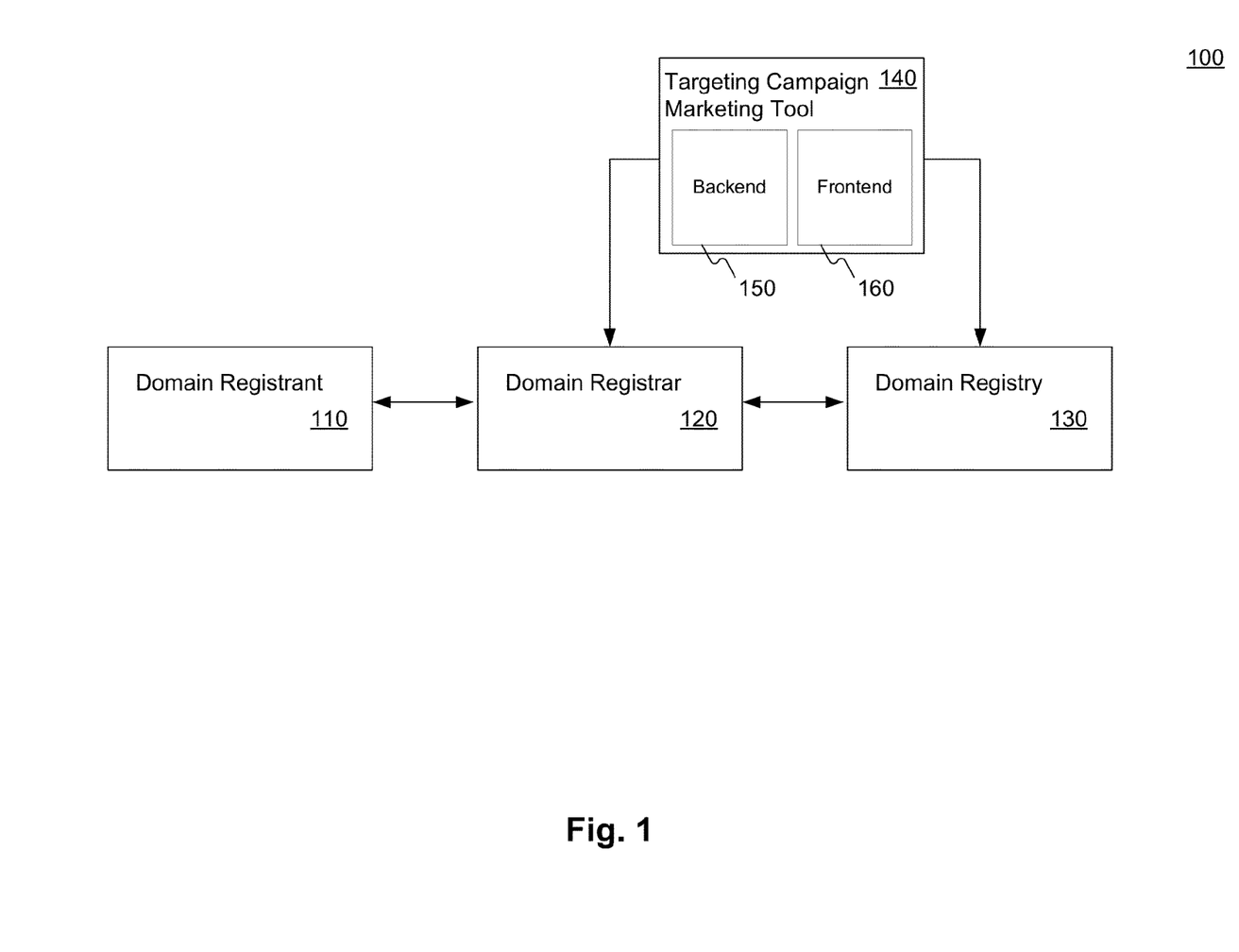
FIG. 1 is an illustration of an exemplary interaction between the Domain Registrant, Domain Registrar, Domain Registry, and Targeting Campaign Marketing Tool.

FIG. 1 illustrates the data flow and relationship definition of the three primary parties involved in a domain registration. The registrant 110 is typically an end user of the domain, but in some cases, may resell the domain to either another registrant in a domain transfer transaction or may retain ownership of the domain but let a third party use it, as when the registrant is a web hosting provider and the third party is a customer of the registrant. Moreover, some registrants never intend to use a domain in a traditional fashion. Some registrants hope to reserve desirable domain names which they can sell for a profit. Other registrants may reserve a name which is a slight variation of a popular website, hoping to receive Internet traffic from people mistyping the URL of the popular website. In other words, some registrants will find new ways to use the domain name system other than for the traditional use of hosting websites associated with the domain name that directs a user to a website.

Registrants 110 reserve domain names from registrars 120. Thus, the registrant's 110 relationship is primarily with the registrar 120. The registrar, however, maintains a relationship with one or more registries 130 that control the TLD for which registration is desired. Typically, large registrars have multiple relationships with many registries to assure they can provide registrants with many TLD domain options when reserving their domains. The abstraction between the registry 130 and registrant 110 is convenient to the registrant because the registrant 110 can register all or most of its domain names from one registrar 120, rather than having to have relationships with multiple registries 130.

Registries 130 control the assignment of domain names. A registry is responsible for assuring that domain information is accurate and up to date. Further, the registry is responsible for providing first level DNS support for the TLD. For example, the registry that manages the .ORG TLD must provide (or otherwise make available) a DNS server containing nameserver information for a domain name registered through the registry so that when a website is requested via the domain name in a URL, the proper nameserver will eventually respond to the request, by providing a fully resolved domain name (that is, resolved to the IP address of the machine designated as responsible to respond for the domain name). Registrar 120 and registry 130 each comprise one or more computers to implement the functions described herein, and may correspond to functions and structures disclosed below.

A Targeting Campaign Marketing Tool 140 may be provided by a Registry 130 for use by a Registrar 120. In an embodiment, a Targeting Campaign Marketing Tool 140 may be implemented by a Registrar 120 for its own use. In another embodiment, a Targeting Campaign Marketing Tool 140 may be implemented by a third party and provide targeted campaign marketing services to a registrar or registry. The Tool 140 includes a backend system 150 to generate a data feed of expiring domains with each domain's probability of deletion. The Tool 140 may also include a frontend system 160 to define marketing campaigns, apply these campaigns against the feed, and send the campaign offers to registrants. One skilled in the art, however, will recognize that the Tool 140 and its components, the backend system 150 and frontend system 160, may be implemented in a multitude of separated task specific and dedicated systems that work together to achieve the claimed subject matter.

The Targeting Campaign Marketing Tool 140 may be implemented in software as software modules or programs on one or more computing systems. For example, the functionality of the Tool 140 server may comprise one or more applications, which may comprise one or more computer units of computer-readable instructions which, when executed by a processor, cause one or more computers to perform steps of a method. In particular, the software modules or programs may be executed on one or more computers to accomplish the overall method. Computer-readable instructions may be stored on a computer-readable medium, such as a memory or disk. Such media typically provide non-transitory storage. One or more of the components may be hardware components or combinations of hardware and software such as, for example, special purpose computers or general purpose computers. A computer or computer system may also comprise an internal or external database. The database may be implemented in a commercial, open-source, or proprietary database, or the database may be any data storage mechanism, such as a flat file or log file. The database may comprise one or more individual databases or databases configured to act together. The components of a computer or computer system may, among other things, connect through a local bus interface or over a local or wide area network.

In an embodiment, one or more of the components of the Tool 140 may be a computer server with web services enabled. For example, the Tool 140 may contain a processor web service for processing targeted marketing campaign requests initiated from user connected via a network and through a web browser. The components depicted in FIG. 1 may be operatively connected to one another via a network, not shown, such as the Internet, an intranet, or any type of wired or wireless communication system. Connections may be implemented through a direct communication link, a local area network (LAN), a wide area network (WAN) and/or other suitable connections.

Figure 2:
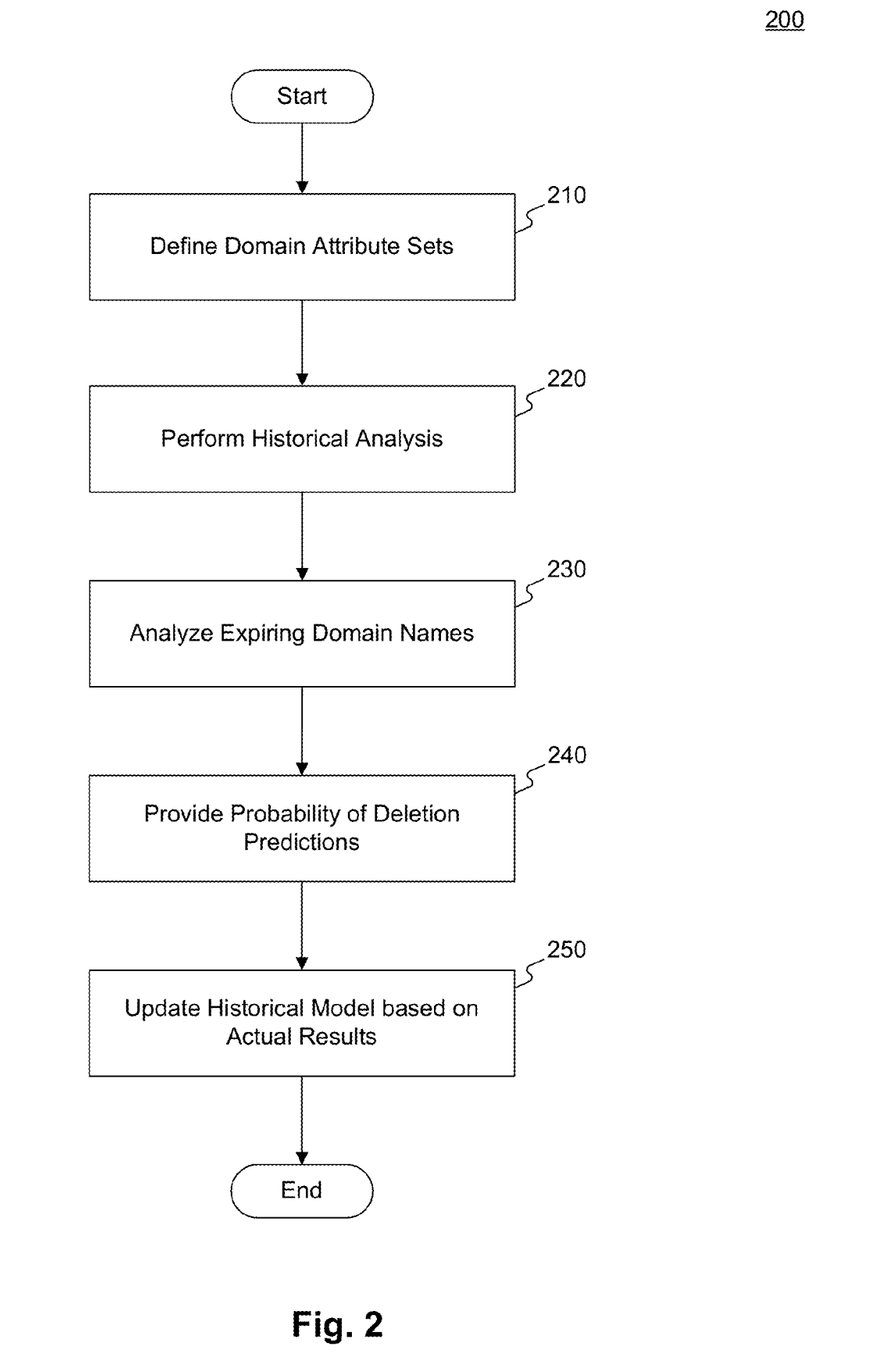
FIG. 2 is an illustration of an exemplary embodiment that predicts the likelihood that a domain name will be renewed.

FIG. 2 illustrates an exemplary embodiment of a method that may be used by the Targeting Campaign Marketing Tool 140 to provide such services to users of the tool. In step 210, the Tool 140 defines domain attribute sets. A domain attribute set is made up of combinations of a domain attributes and possible values or ranges of values for the domain attributes. The domain attribute set need not define values for all attributes. The Tool 140 uses domain attribute sets to categorize past domain names and build a historical model from which to base predictions on expiring domain names. Exemplary domain attribute sets will be described in more detail below. In step 220, the Tool 140 may perform a historical analysis based on the domain attribute sets. The historical analysis may also be altered based on current data or predicted future data as well. In step 230, the Tool 140 may analyze expiring domain names based on the historical model. To do so, the Tool 140 may categorize each expiring domain under consideration into the domain attribute sets and adopting the historical probability of deletion value as its own. The Tool 140 may also modify the probability of deletion value based on current data or predicted future data as well. In step 240, the Tool 140 may provide the results of the analysis in the form of predictions of whether the expiring domain names will be allowed to expire and be deleted. The Tool 140 may provide a bulk output of the prediction or an identified subset for use in a marketing activity. The Tool 140 may perform the marketing activity. The Tool 140 may perform the marketing activity based on inputs or specialized offers from particular registrars. In step 250, the Tool 140 may compare the predicted results with the actual results to refine the Tool's prediction capabilities.

Figure 3:
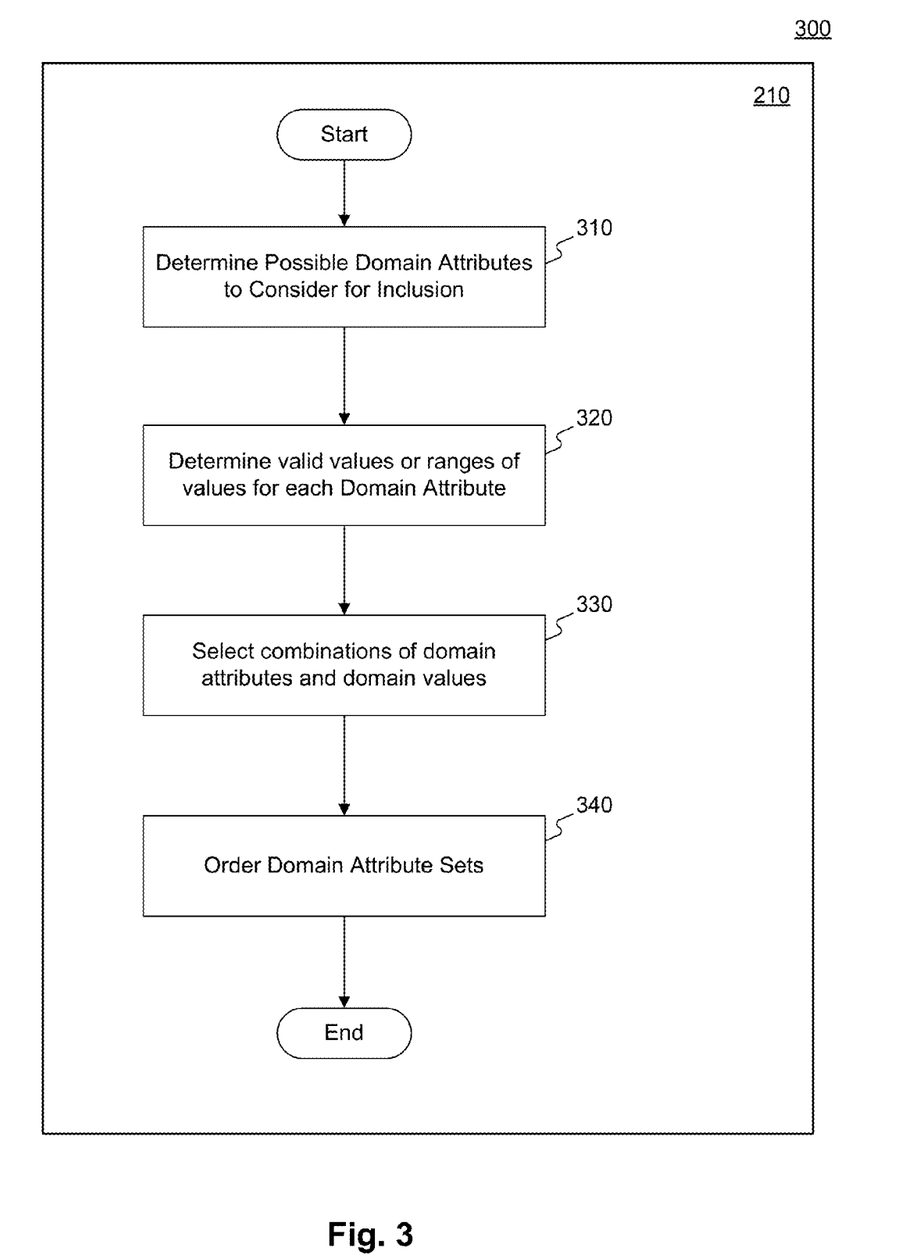
FIG. 3 is an illustration of an exemplary embodiement that determines the domain attribute sets to use in the prediction analysis.

FIG. 3 illustrates an exemplary process to define domain attribute sets. In step 310, possible domain attributes may be determined. Domain attributes are characteristics of a domain name such as the domain's registrar, TLD, type (ASCII or non-Arabic character sets), length, percentage that is a dictionary word, and renewal history. Thus, the domain attributes may be made up of physical characteristics of the domain name words, such as length, or characteristics associated with the domain name, such as the responsible registrar, the registry status flags set, or the nameservers assigned. Additional associations may be made with the domain name that may also be domain name attributes. For example, the popularity of a website associated with the domain name or the type of website hosted at the domain name may also be considered as domain attributes. Other domain attributes may involve attributes associated with the domain as they are tied to current political, economic, or news items. For example, a domain name with the word "politics" or "election" in the name may be more valuable in a presidential election year than otherwise; a domain name with the word "earthquake" or "disaster" in the name may be more valuable for a time after such a natural disaster occurred; or a domain name with the word "rate" or "interest" or "unemployment" may be more valuable in times of economic uncertainty.

Figure 4:
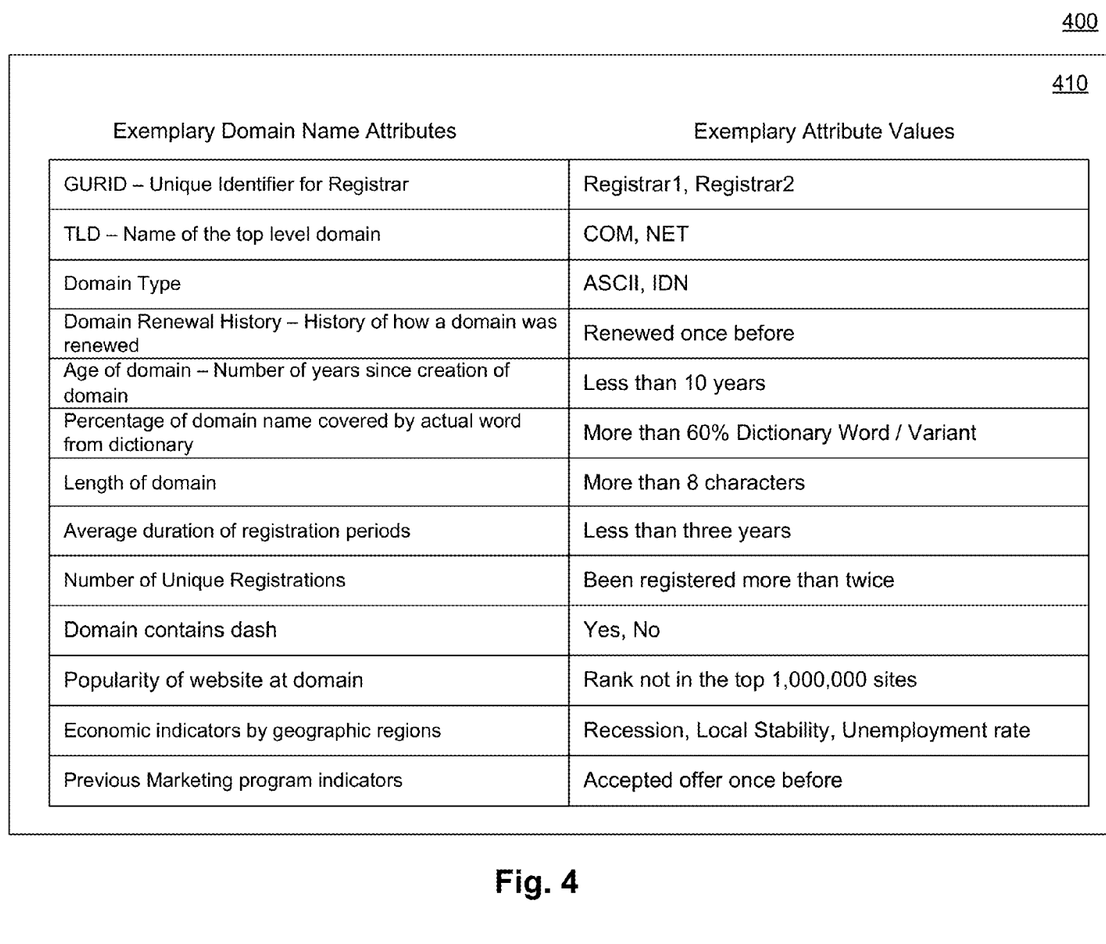
FIG. 4 is an illustration showing exemplary domain attributes and exemplary attribute values.

In step 320, valid values for the domain attributes may be determined for each of the domain attributes. The values may be singular, numeric, sets, or ranges. The values and attributes work together. For example, a valid value may be "yes" or "no," when the domain attribute is "length less than ten characters," but, alternatively, the attribute may be "length" and the value "less than ten characters." An example of a set of values may be that for the attribute "registrar," valid values are "registrar X, registrar Y, or registrar Z." FIG. 4 shows exemplary domain attributes and exemplary attribute values. A particular domain attribute/value combination should tend to either probabilistically support that the domain name would be renewed or that the domain name would expire without renewal. For example, an attribute/value combination defined as domain names containing more than fifteen characters would probably suggest that a domain name matching this attribute would not be renewed. On the other hand, other attribute/value combinations that the domain also shares may suggest that the domain would be renewed, such as when the domain name is greater than fifteen characters, but also has a popularity rank in the top 10,000 websites. The combination of all domain attribute/value combinations in a domain set will determine the probability of deletion for a domain name belonging to the domain set. A person of skill in the art will recognize that the probability of deletion may conversely be expressed as a probability of renewal or predicted renewal rate, because domain names will either be renewed or deleted after expiration. Thus, one probability is necessarily reflected in its counterpart. Because the Tool 140 targets domain names likely to be deleted (not renewed), the disclosure primarily uses the phrase "probability of deletion," but it should also be understood that a similar analysis may be done using the probability of renewal.

Figure 5:
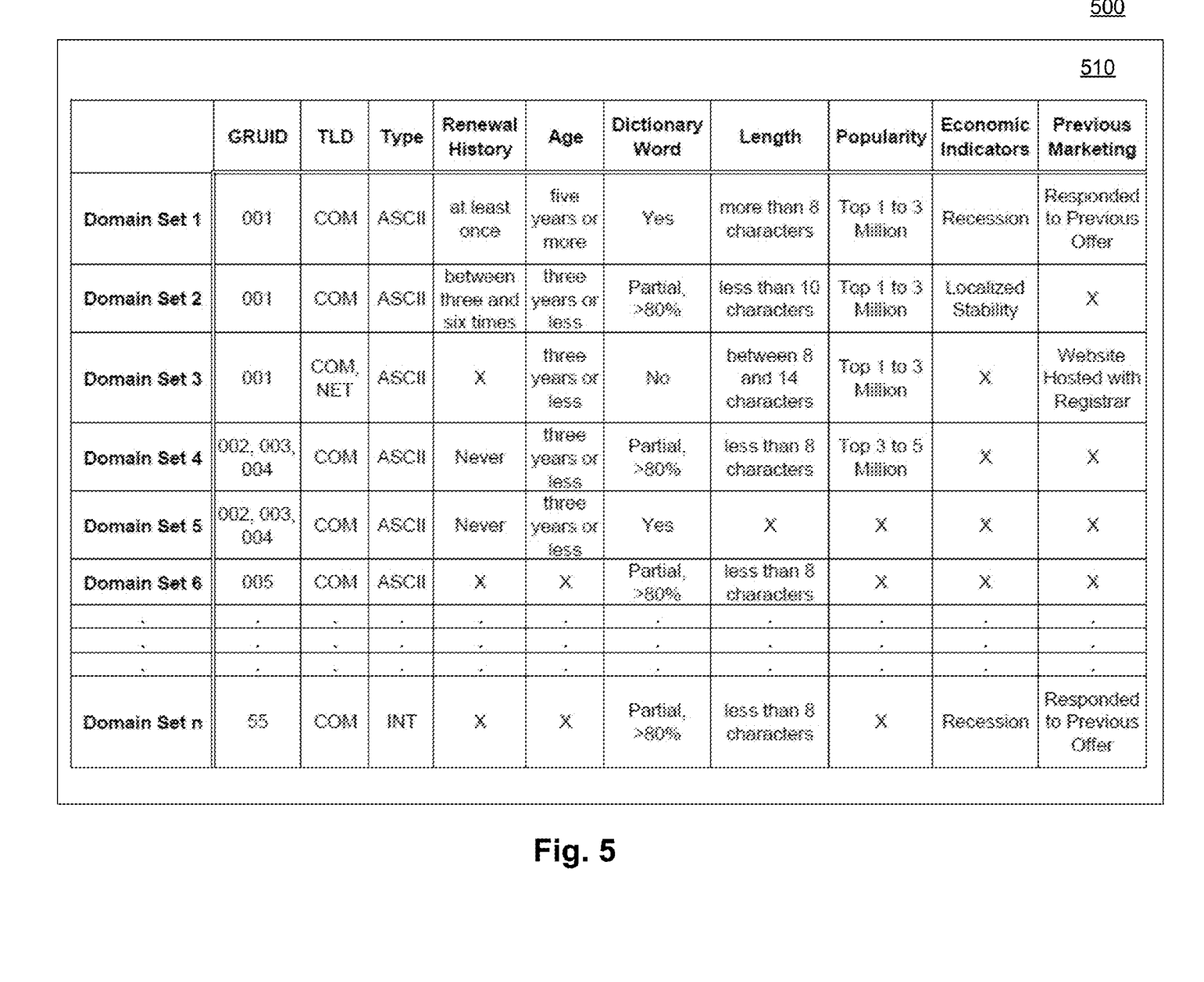
FIG. 5 is an illustration of exemplary domain attribute sets.

Turning back to FIG. 3, in step 330, combinations of domain attributes and domain values are selected for each domain attribute set. One attribute set may contain four defined attribute/value combinations and another eight defined attribute/value combinations. There may be hundreds or thousands of domain attribute sets. FIG. 5 shows exemplary domain attribute sets. In one embodiment, all possible combinations of attributes/values may be utilized to define domain attribute sets comprising every possible combination of attributes/values. Additional domain attribute sets may include a multitude of sets by removing one particular attribute/value. For example, attribute sets A, B, C, D, and E, may all define seven attribute/values the same way, but define an eighth attribute with different values. If the eighth attribute/value is removed from each of A, B, C, D, and E, then a new domain set including all of A, B, C, D, and E would be created. One skilled in the art will recognize that additional domain attribute sets can be combined in a similar way by removing additional particular attribute/value combinations. One skilled in the art will also recognize that the domains belonging to A, B, C, D, and E above can all be included in many other domain attribute sets that were formed by removing different attribute/values. Statistically significant data may be developed by combining domain attribute sets in this way, e.g. if A, B, C, D, and E each only have 20 historical domains, combining them would result in a set of 100 domain names, which may provide a more statistically significant prediction. This aspect is further discussed with respect to step 750, below.

Turning back to FIG. 3, in step 340, the domain attribute sets may be ordered into a preference. Generally, the more domain attribute/value combinations defined in a domain attribute set, the better the predictive accuracy of the model should be. In other words, the more granular the attribute set, the higher general preference to use the predictive value given by that attribute set over another. Attribute sets that contain the same granularity, i.e. the same number of attribute/value combinations, may be further ordered based on the particular attribute/value combinations chosen. For example, in an embodiment, one domain attribute set containing the attribute/value combination corresponding to domain names containing a popularity indicator may be disfavored over another attribute set containing a dictionary word indicator, where all other domain attributes are the same. In other words, in an embodiment, the domain attributes may be ordered in a rank of preference and the preference of the domain attribute sets may be based on the preference of domain attributes.

Figure 6:
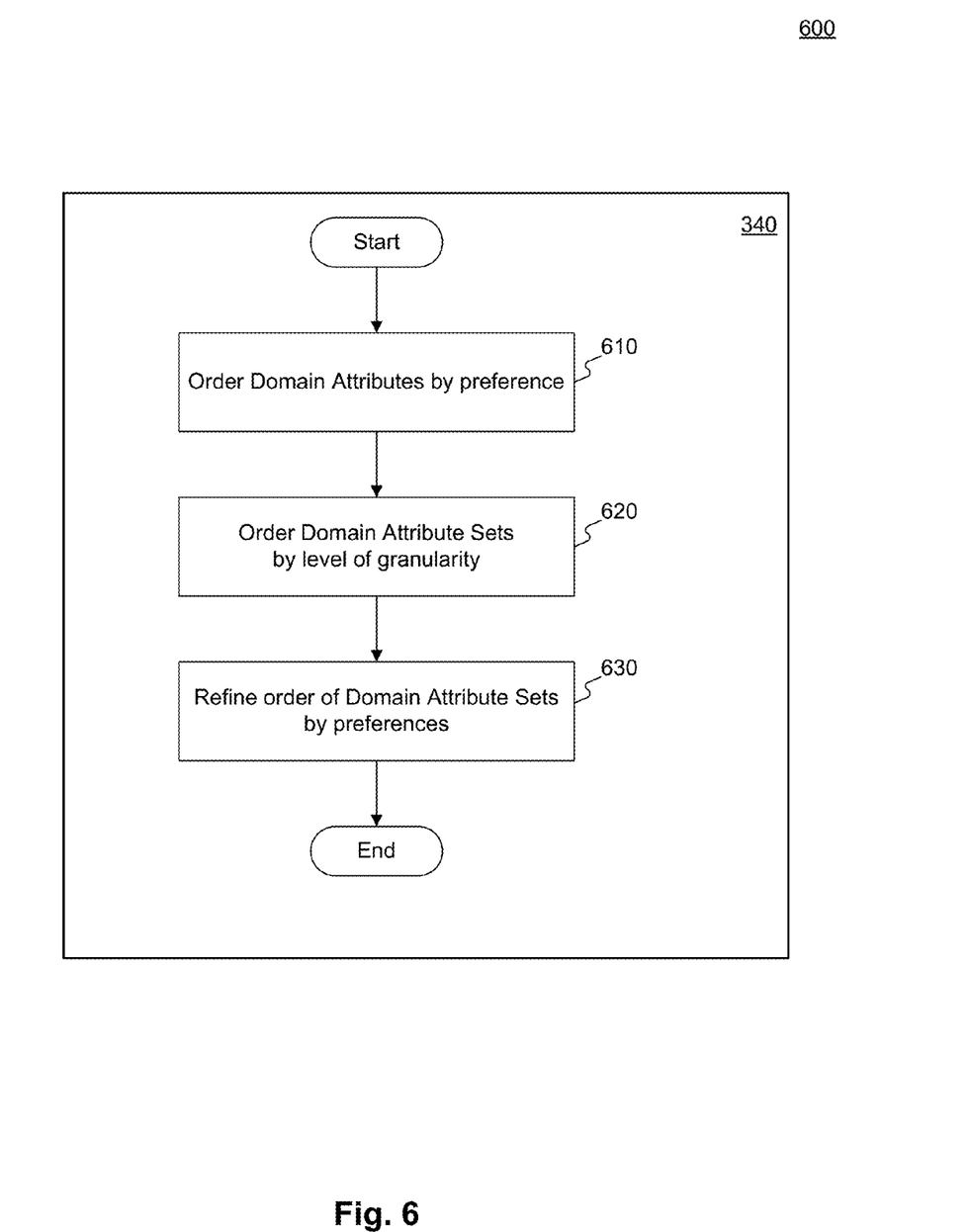
FIG. 6 is an illustration of an exemplary embodiment showing how the ordering the domain attribute sets may be performed.

FIG. 6 illustrates an exemplary embodiment showing how the ordering may be performed. In step 610, the domain attributes may be ordered by preference. In step 620, the domain attribute sets may be ordered by level of granularity. The ordering in exemplary step 620 may also be based on the result of step 610, further ordering the domain attribute sets of the same granularity. In step 630, in an embodiment, the order of the domain attribute sets may be further altered based on current socioeconomic, political, geographic, or news data.

For example, domain attribute sets that contain a domain attribute/value combination having to do with current socioeconomic, political, or news data may receive a preference over attribute sets that are of the same granularity or higher granularity. In step 630, likewise, in an embodiment, domain attribute sets that contain a domain attribute/value combination with a more moderate effect on the predictive value of the combination may be disfavored. For example, if the combination attribute/value is defined as domain names between eight and twelve characters, the predictive value of this combination might be less than a similar combination defined as domain names less than six characters, i.e. a domain name containing less than six characters may likely be renewed, but the characteristic that a domain name is between eight and twelve characters may not weigh much on a registrant's decision whether to renew the domain name. In an embodiment, the preference adjustments of step 630 may be based on actual performance of the model over time based on data input from step 250.

Figure 7:
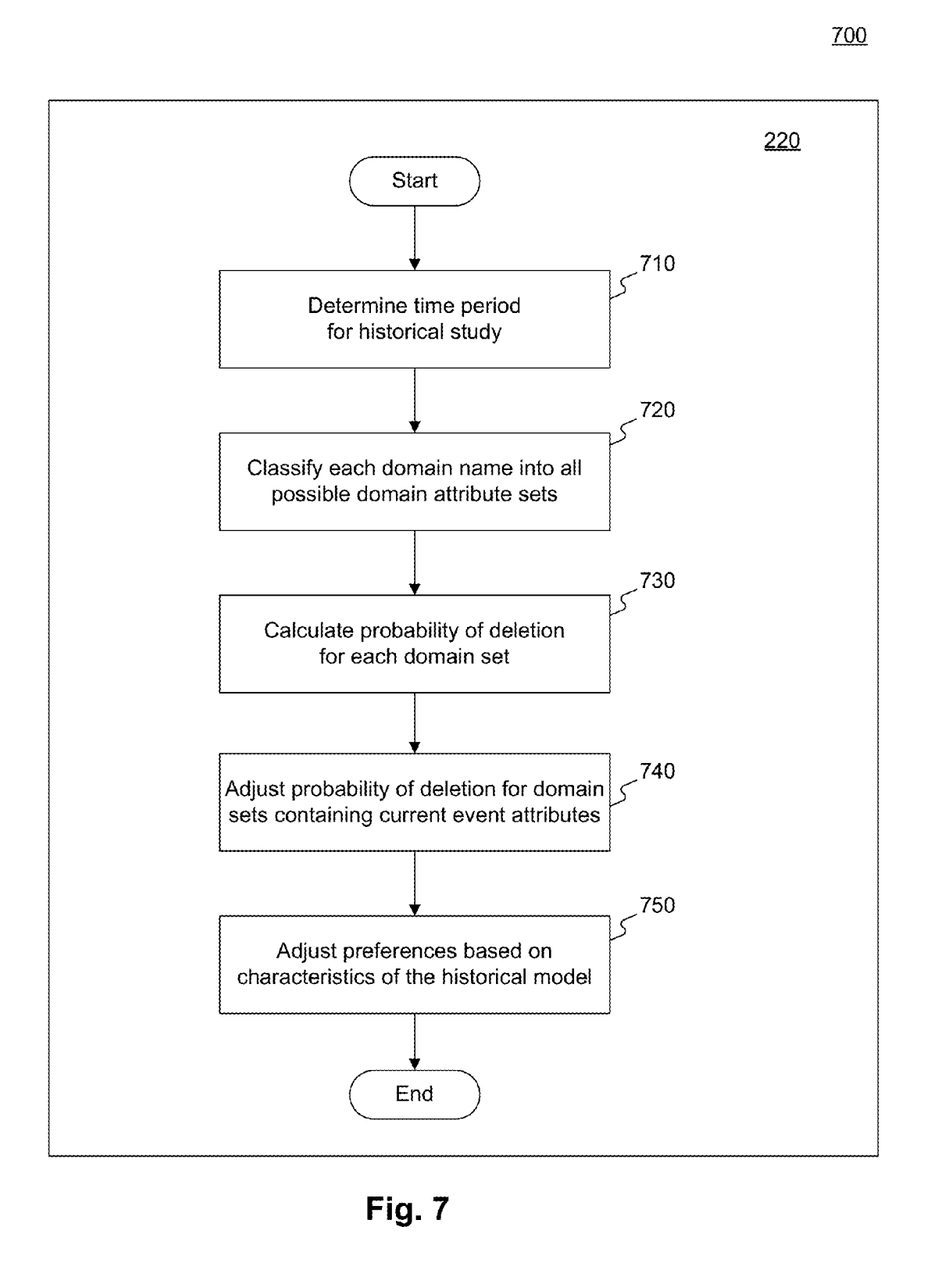
FIG. 7 illustrates an exemplary embodiment that analyzes a set of past domain expirations and renewals.

FIG. 7 illustrates an exemplary embodiment that analyzes a set of past domain expirations and renewals. In step 710, the time period may be set for analyzing the domain expirations and renewals. The time period may defined broadly or narrowly, set as a trailing window, such as the previous two-months, such that the predictive numbers are constantly updated, or set as a defined window and updated less frequently. The time period may be based on any applicable factor, such as season or month. For example, for predictions of domain names expiring July 1-15, the model may be built on domain names expired or renewed July 1-15 of the previous year.

In step 720, the domain names expired or renewed in the applicable time period may be classified into every domain attribute set to which they belong. For example, a domain name having the combination attribute/values that make up a set would belong to that set. A particular domain name would probably not belong to every set, but may belong to multiple sets. Some domain names may not belong to any sets. In step 730, each set may be analyzed to determine the probability of deletion for all the domains in the set. To find the probability of deletion the number of deleted domains may be divided by the total number of domains in the set. In step 740, the percentages may be further adjusted based on attribute/values that may not be reflected in the historical data. For example, a current event, such as an earthquake may not be accurately reflected in the domain name data because the event or condition is current. In an embodiment, this change may be made instead of or in addition to the similar adjustment made in step 630 as discussed above. In step 750, in an embodiment, aspects of the historical data itself may be accounted for and the preferences further adjusted accordingly. For example, if the date range contained 10,000 expired or renewed domain names, a domain attribute set with only 10 domain names in it may be less reliable as a predictive model than a domain attribute set with 500 domain names in it. Therefore, in an embodiment, domain attribute sets containing a number of domain names less than a percentage of the total domain names analyzed or less than a threshold value of domain names may be eliminated or adjusted down in order as less reliable.

Figure 8:
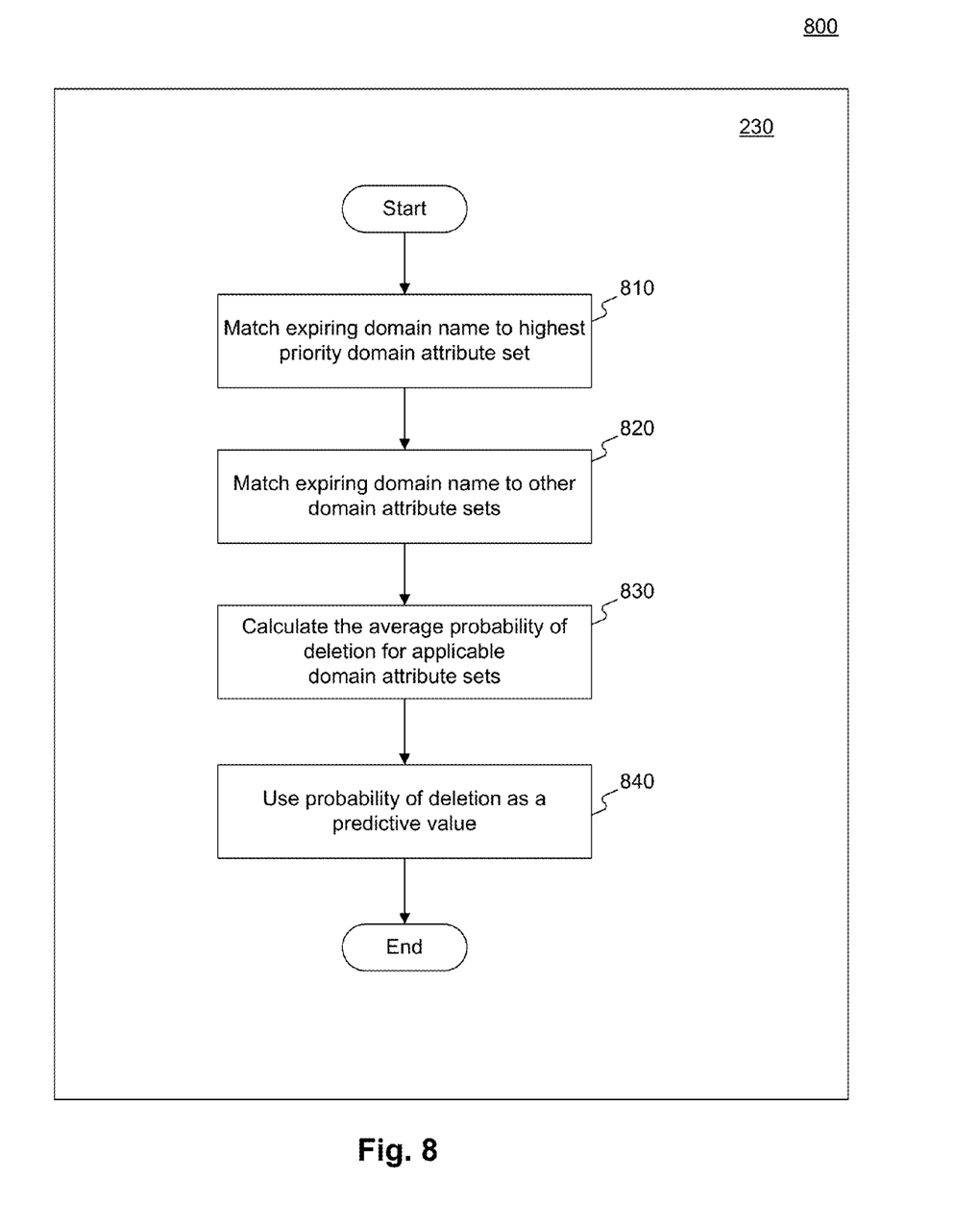
FIG. 8 illustrates an exemplary embodiment that analyzes expiring domain names based on an historical model.

FIG. 8 illustrates an exemplary embodiment that analyzes expiring domain names based on the historical model developed from exemplary process 700. In an embodiment, the expiring domains from a target window analyzed using the historical model to determine a predicted likelihood that the domain names would be renewed without any marketing offer. In step 810, an expiring domain name may be match to the highest priority domain attribute set. In step 820, in an embodiment, the expiring domain name may be matched to additional domain attribute sets. It may be matched to all of them or a subset of them, such as the top five domain attribute sets in order of preference or the top 50 percent of the domain attribute sets to which it belongs. In step 830, in an embodiment, if step 820 was executed, the probability of deletion for all of the domain attribute sets selected in step 820 are averaged to determine an average probability of deletion for the domain sets. In an embodiment, a weighted average may be used to put more emphasis on the more preferred domain attribute sets. In step 840, the probability of deletion determined as a result of step 810 or 830 may be used as a predictive value for whether the domain name will be renewed. The predicted probability of deletion may be modified based on current event factors as discussed with respect to steps 630 and 740, above. In an embodiment, such an adjustment may be made in addition to or instead of the adjustments of steps 630 and 740, above.

Figure 9:
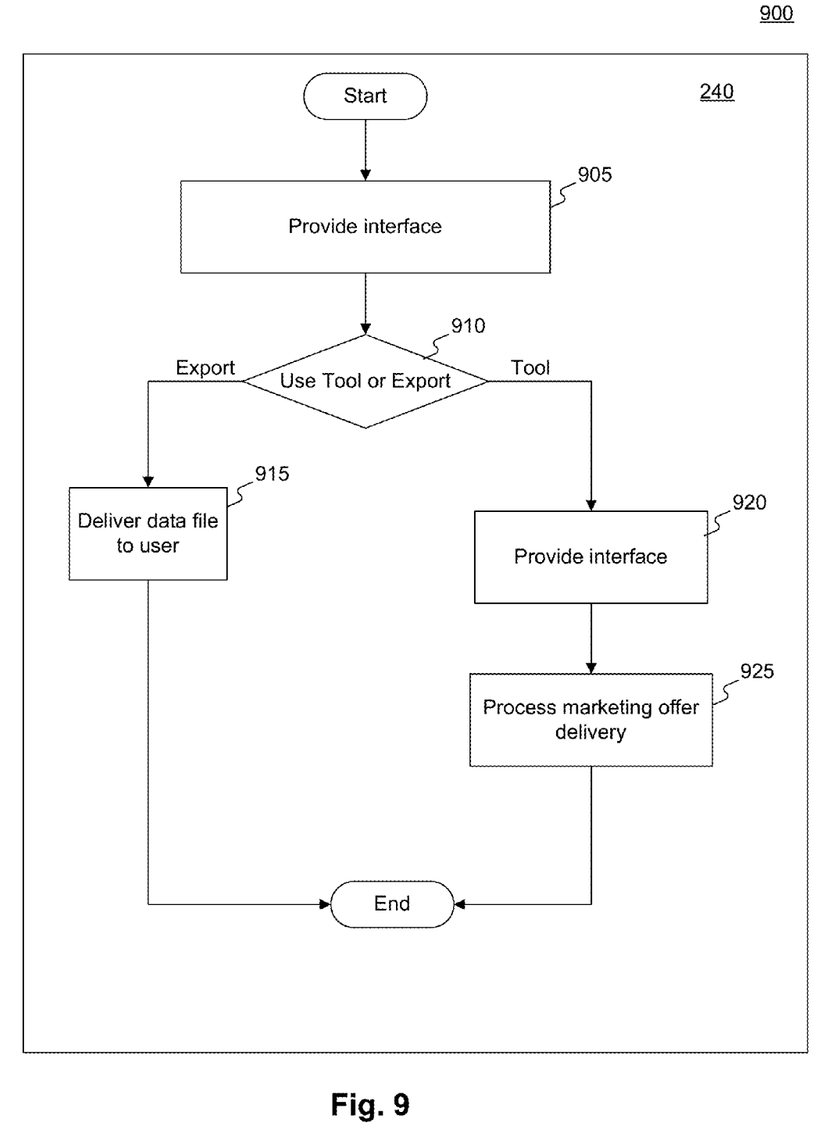
FIG. 9 illustrates an exemplary embodiment that provides the probability of deletion predictions.

FIG. 9 illustrates an exemplary embodiment that provides the probability of deletion predictions. In step 905, an interface is provided to the results. In an embodiment, the predicted values may be placed in a known file location and retrieved via a communications means, such as HTTP or FTP. In an embodiment, the results may be emailed. In step 910, in an embodiment, it is determined whether the Tool 140 will provide the targeted marketing services for the expiring domain names or whether the predicted values will be exported to a user or user's separate system for use. In step 915, in an embodiment, a data file is delivered to the user or user's separate system. The data file may be any electronic representation of the data, including, but not limited to a database or flat file. The delivery may be made in response to a request from the user or user's computer system or may be delivered without specific input from the user or user's computer system. The delivery may be made via an electronic transmission. In step 920, in an embodiment, if the Tool 140 will provide the marketing services, an additional interface is provided to receive instructions from a user regarding which particular marketing campaigns should be used and which particular marketing offers may be used. In an embodiment, the user may provide formatting instructions to the Tool 140 so that the marketing offer is formatted according to the user's specifications. This feature may provide the opportunity for a user to brand the marketing offers with its own particular look, feel, design, and logos. In step 925, in an embodiment, the Tool 140 may deliver the selected marketing offers to the domain contacts of the domains targeted by the user.

Figure 10:
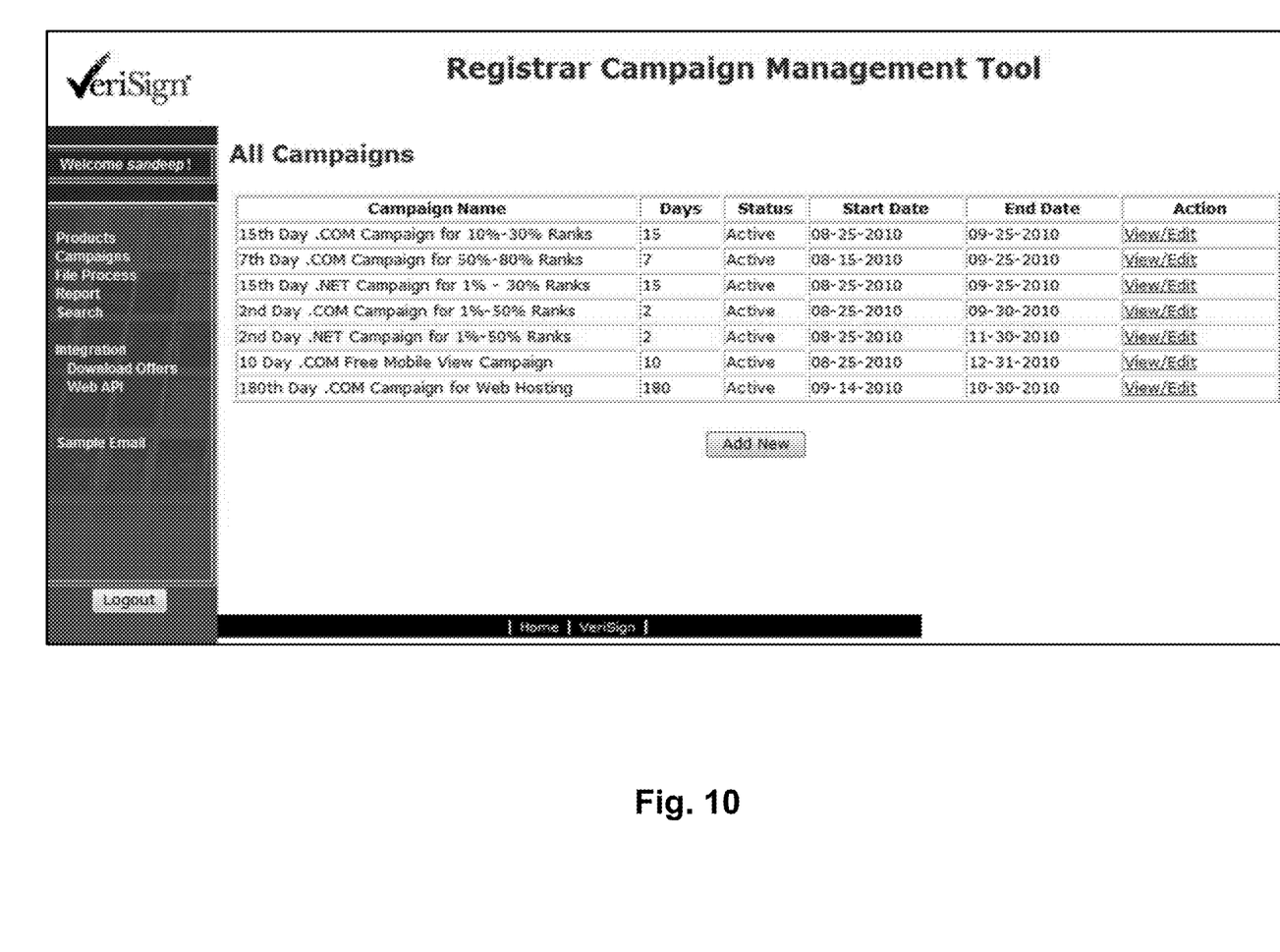
FIG. 10 illustrates an exemplary embodiment of an interface that shows different marketing campaigns that may be defined in the Tool.

FIG. 10 illustrates an exemplary embodiment of an interface that shows different marketing campaigns that may be defined in the Tool 140. These campaigns may target specific users based on their predicted probability of deletion and expiration date. For example, a user may want to offer a $1 discount for domains expiring in 15 days, a $2 discount for domains expiring in 7 days, and a $3 discount for domains expiring in 2 days. The interface allows the user to define multiple marketing campaigns and run them every day to target only particular domain names. This also allows the targeted marketing activity to occur without spamming domain owners with an excessive amount of marketing offers.

Figure 11:
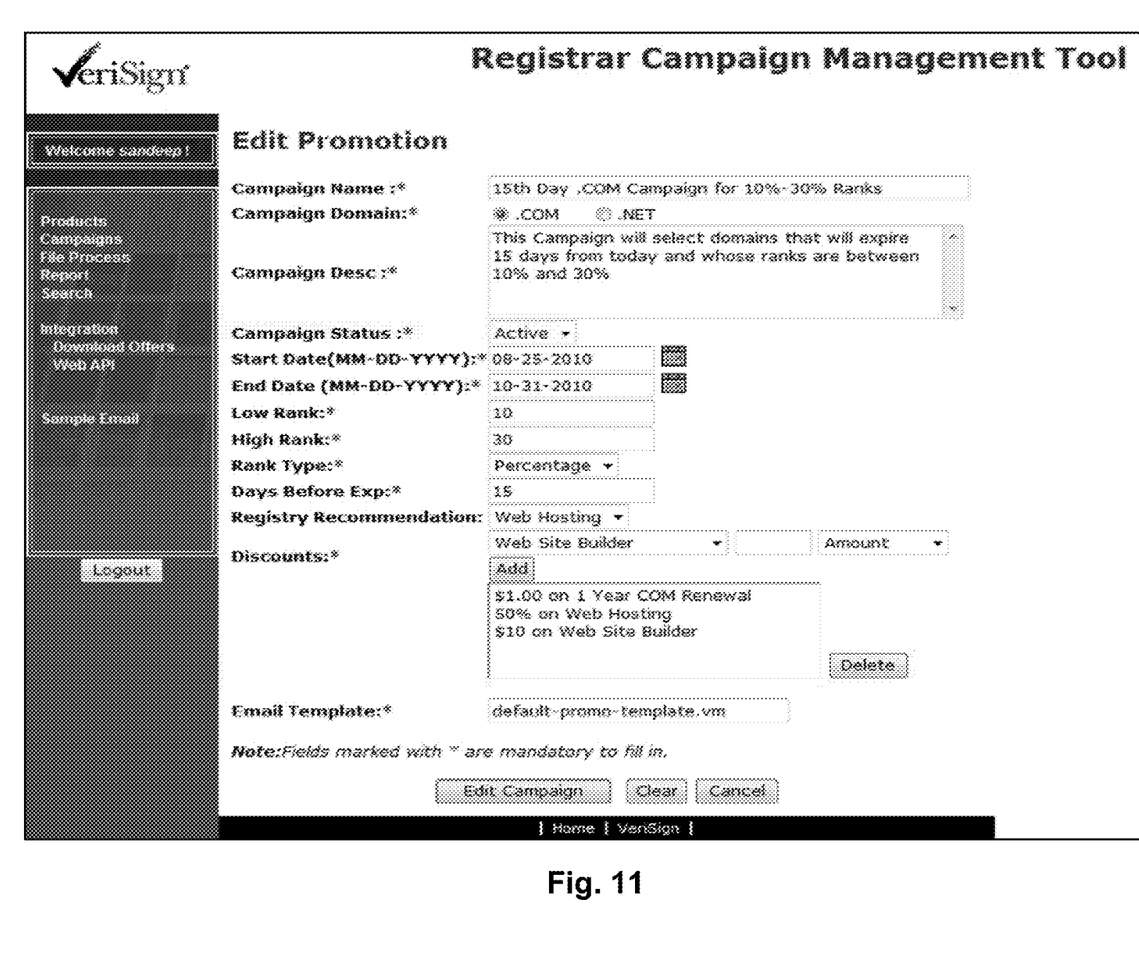
FIG. 11 illustrates an exemplary embodiment that shows details of a marketing campaign enabled by the Tool.

FIG. 11 illustrates an exemplary embodiment that shows details of a marketing campaign enabled by the Tool 140. Different marketing offers may be added to the marketing offer.

Other embodiments of the invention will be apparent to those skilled in the art from consideration of the specification and practice of the embodiments disclosed herein. In particular, it should be appreciated that the processes defined herein are merely exemplary, and that the steps of the processes need not necessarily be performed in the order presented. It is intended that the specification and examples be considered as exemplary only, with a true scope and spirit of the embodiments being indicated by the following claims.

What is claimed is:

1. A computer-implemented method of targeting marketing offers comprising:
    defining, by one or more processors, domain attribute sets for domain names;
    performing, by the one or more processors, an historical analysis using the domain attribute sets;

analyzing, by the one or more processors, expiring domain names based on the historical analysis and the domain attribute sets;

providing, by the one or more processors, probability of deletion predictions based on the analyzing of the expiring domain names; and providing a targeted marketing offer to a current owner of a domain name based on the probability of deletion predictions.

2. The method of claim 1, wherein defining domain attribute sets comprises:

defining domain attributes;

defining valid values for each domain attribute; and selecting at least one domain attribute set comprising combinations of domain attributes and domain values.

3. The method of claim 2, comprising:

selecting a plurality of domain attribute sets comprising combinations of domain attributes and domain values; and ordering the plurality of domain attribute sets in an order of preference based on the combinations of domain attributes and domain values.

4. The method of claim 1, wherein performing the historical analysis comprises:

selecting renewed and expired domain names within a time period;

classifying each renewed and expired domain names into the domain attribute sets; and calculating a probability of deletion for each domain set.

5. The method of claim 1, comprising:

adjusting the probability of deletion predictions, by the one or more processors, based on any, or combinations of, political factors, economic factors, news event factors, and regional factors.

6. The method of claim 1, wherein the analyzing expiring domain names comprises:

determining a domain name belongs to a domain attribute set;

determining a predicted probability of deletion as the probability of deletion of the domain attribute set.

7. The method of claim 1, wherein the providing comprises:

electronically sending the probability of deletion predictions via a data file.

8. The method of claim 1, wherein the targeted marketing offer comprises an offer to renew registration of the domain name at a reduced price.

9. A system of targeting marketing offers comprising:

a non-transitory memory storing instructions; and a processor executing the instructions to cause the system to perform a method comprising:

defining domain attribute sets for domain names;

performing an historical analysis using the domain attribute sets;

analyzing expiring domain names based on the historical analysis and the domain attribute sets;

providing probability of deletion predictions based on the analyzing of the expiring domain names; and providing a targeted marketing offer to a current owner of a domain name based on the probability of deletion predictions.

10. The system of claim 9, wherein defining domain attribute sets comprises:

defining domain attributes;

defining valid values for each domain attribute; and selecting at least one domain attribute set comprising combinations of domain attributes and domain values.

11. The system of claim 10, wherein the method comprises:

selecting a plurality of domain attribute sets comprising combinations of domain attributes and domain values; and ordering the plurality of domain attribute sets in an order of preference based on the combinations of domain attributes and domain values.

12. The system of claim 9, wherein performing the historical analysis comprises:

selecting renewed and expired domain names within a time period;

classifying each renewed and expired domain names into the domain attribute sets; and calculating a probability of deletion for each domain set.

13. The system of claim 9, wherein the method comprises:

adjusting the probability of deletion predictions based on any, or combinations of, political factors, economic factors, news event factors, and regional factors.

14. The system of claim 9, wherein the analyzing expiring domain names comprises:

determining a domain name belongs to a domain attribute set;

determining a predicted probability of deletion as the probability of deletion of the domain attribute set.

15. The system of claim 9, wherein the providing comprises:

electronically sending the probability of deletion predictions via a data file.

16. A non-transitory computer-readable storage medium containing instructions which, when executed on a processor, perform a method comprising:

defining domain attribute sets for domain names;

performing an historical analysis using the domain attribute sets;

analyzing expiring domain names based on the historical analysis and the domain attribute sets;

providing renewal rate predictions based on the analyzing of the expiring domain names; and providing a targeted marketing offer to a current owner of a domain name based on the probability of deletion predictions.

17. The computer-readable medium of claim 16, wherein defining domain attribute sets comprises:

defining domain attributes;

defining valid values for each domain attribute; and selecting at least one domain attribute set comprising combinations of domain attributes and domain values.

18. The computer-readable medium of claim 17, wherein the method comprises:

selecting a plurality of domain attribute sets comprising combinations of domain attributes and domain values; and ordering the plurality of domain attribute sets in an order of preference based on the combinations of domain attributes and domain values.

19. The computer-readable medium of claim 16, wherein performing the historical analysis comprises:

selecting renewed and expired domain names within a time period;

classifying each renewed and expired domain names into the domain attribute sets; and calculating a renewal percentage for each domain set.

20. The computer-readable medium of claim 16, wherein the method comprises:

adjusting the renewal rate predictions based on any, or combinations of, political factors, economic factors, news event factors, and regional factors.

21. The computer-readable medium of claim 16, wherein the analyzing expiring domain names comprises:
- determining a domain name belongs to a domain attribute set;
- determining a predicted renewal percentage as the renewal percentage of the domain attribute set.

22. The computer-readable medium of claim 16, wherein the providing comprises: electronically sending the renewal rate predictions via a data file.

* * * * *